US010897789B2

(12) United States Patent
Suzuki et al.

(10) Patent No.: US 10,897,789 B2
(45) Date of Patent: Jan. 19, 2021

(54) USER EQUIPMENT FOR EXECUTING DUAL CONNECTIVITY USING URLLC

(71) Applicant: Panasonic Intellectual Property Corporation of America, Torrance, CA (US)

(72) Inventors: Hidetoshi Suzuki, Kanagawa (JP); Anitha Arun Prasad, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/606,375

(22) PCT Filed: Apr. 3, 2018

(86) PCT No.: PCT/JP2018/014197
§ 371 (c)(1),
(2) Date: Oct. 18, 2019

(87) PCT Pub. No.: WO2018/220992
PCT Pub. Date: Dec. 6, 2018

(65) Prior Publication Data
US 2020/0059981 A1 Feb. 20, 2020

(30) Foreign Application Priority Data
May 31, 2017 (JP) ................. 2017-108098

(51) Int. Cl.
*H04W 88/06* (2009.01)
*H04W 76/15* (2018.01)
*H04W 36/00* (2009.01)
*H04W 72/04* (2009.01)

(52) U.S. Cl.
CPC ....... *H04W 76/15* (2018.02); *H04W 36/0069* (2018.08); *H04W 72/04* (2013.01); *H04W 88/06* (2013.01)

(58) Field of Classification Search
CPC ............................. H04W 88/06; H04L 1/0009
See application file for complete search history.

(56) References Cited

U.S. PATENT DOCUMENTS

2020/0059981 A1* 2/2020 Suzuki ................. H04W 88/06
2020/0288409 A1* 9/2020 Li ........................ H04L 1/0009

OTHER PUBLICATIONS

International Search Report of PCT application No. PCT/JP2018/014197 dated Jul. 3, 2018.

(Continued)

*Primary Examiner* — William D Cumming
(74) *Attorney, Agent, or Firm* — Seed IP Law Group LLP

(57) ABSTRACT

In user equipment, a wireless interface circuit simultaneously communicates with two communication networks. A control circuit decides to use a first reserved power of one communication network where URLLC transmission is necessary, and a second reserved power of the other communication network in which the URLLC is not operated, for the URLLC transmission as to the one communication network. The wireless interface circuit transmits URLLC signals over the one communication network, using the first reserved power and the second reserved power.

24 Claims, 10 Drawing Sheets

(56) References Cited

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TSG RAN WG1 Meeting #88, R1-1702995, "Power Control for Multiplexing of eMBB and URLLC", Feb. 2017.
3GPP TSG-RAN WG1 Meeting #89, R1-1708221, "On power sharing between LTE and NR in DC", May 2017.

\* cited by examiner

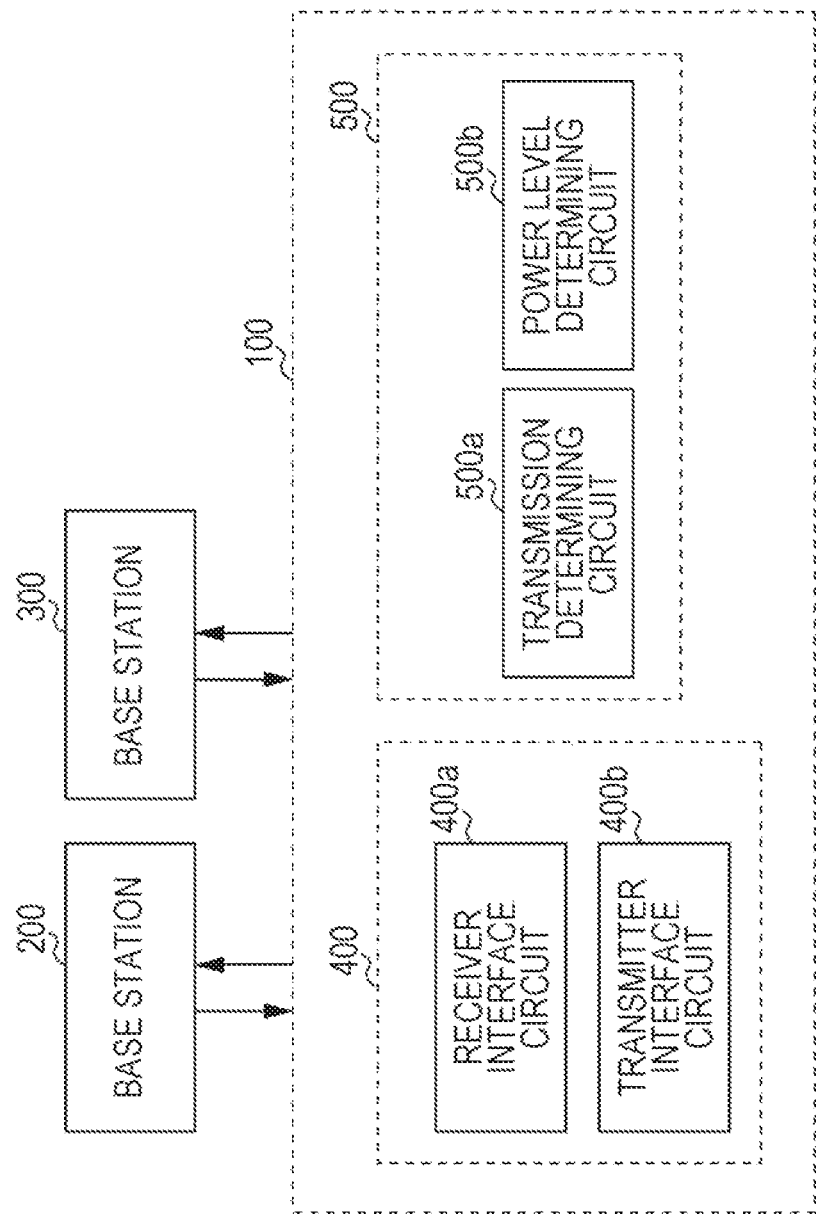

USER EQUIPMENT FOR EXECUTING DUAL CONNECTIVITY USING URLLC

TECHNICAL FIELD

The present disclosure relates to dual connectivity in a communication network, and more particularly, relates to dual connectivity in communication networks such as LTE (Long Term Evolution), NR (New Radio network), and so forth.

BACKGROUND ART

The 3GPP (Third Generation Partnership Project) has standardized dual connectivity (DC) technology in Release 12, to handle increasing demand for higher data rates, reduction in user plane latency time, and higher reliability.

According to the DC architecture, user equipment (UE: User Equipment) can simultaneously connect to multiple communication networks (eNBs or base stations). The UE is connected to a master cell group (MCG (Master Cell Group). Also referred to as master communication network) via a MeNB (Master eNB) and connected to a secondary cell group (SCG (Secondary Cell Group). Also referred to as secondary communication network) via a SeNB (Secondary eNB). If non-ideal backhaul exists between the MeNB and SeNB, there are cases where the transmission power of the UE exceeds the maximum transmission power of the UE, causing reduction of important uplink signals, deterioration of user throughput, or the like. Minimum guaranteed transmission power for each cell group is allocated for the UE, to avoid the problem of reduction of important uplink signals.

The 3GPP is aiming to further improve capacity and performance by developing requisites and specifications for 5G New Radio (NR) access technology, as even more emphasis is being placed on our interconnected society with a complete mobile environment. Future usage states and applications of 5G NR are generally classified into the following three usage scenarios for the year 2020 and beyond, by the ITU-R IMT.

eMBB (enhanced Mobile Broadband): ultra-large capacity and ultra-fast data rates mMTC (massive Machine Type Communication): ultra-low energy and ultra-low complexity URLLC (Ultra-Reliable and Low Latency Communication): ultra-reliable and ultra-low latency Emphasis is placed today on interconnectivity among machines and devices, not to mention connectivity among people. The 3GPP has a target of providing reliability up to $10^{-5}$ within 1 ms in future 5G NR cellular systems. Such ultra-reliable and low latency communication (URLLC) is an indispensable function for mission-critical services (vehicular communication, industry automation, healthcare, public safety) and many MTC applications.

Also, NPL 1 proposes, with regard to NR, scenarios of homogeneous and heterogeneous deployment where LTE cells (also referred to as LTE communication network) and NR cells (also referred to as NR communication network) are macro cells or small cells. NPL 1 also studies DC between LTE and NR. Now, there are cases regarding DC where an MCG is made up of LTE cells and an SCG is made up of NR cells, and where an MCG is made up of NR cells and an SCG is made up of LTE cells.

CITATION LIST

Non Patent Literature

NPL 1: 3GPP TR 38.804 V 14.0.0, "Study on New Radio Access Technology; Radio Interface Protocol Aspects (Release 14)," 2017-03

SUMMARY OF INVENTION

Since URLLC is an indispensable function for mission-critical services, it is required that URLLC signals be transmitted with as great a transmission power as possible. Accordingly, there is increased need to handle URLLC in dual connectivity deployment scenarios. However, study regarding control methods of uplink transmission power for URLLC in dual connectivity has been insufficient.

An embodiment of the present disclosure facilitates providing user equipment and a method enabling efficient power use in URLLC supporting dual connectivity.

In an embodiment of the present disclosure, user equipment is provided that is user equipment capable of executing dual connectivity in a communication network, and includes a wireless interface circuit that simultaneously communicates with two communication networks, where URLLC (ultra-reliable, low latency communication) is operated in one of the two communication networks, and a control circuit that determines that the URLLC transmission is necessary regarding the one communication network, and that the URLLC is not operated in another communication network of the two communication networks. The control circuit decides to use a first reserved power of the one communication network, and a second reserved power of the other communication network in which the URLLC is not operated, for transmission of the URLLC as to the one communication network where the URLLC transmission is necessary. The wireless interface circuit transmits signals of the URLLC over the one communication network, using the first reserved power and the second reserved power.

In another general embodiment, user equipment is provided that is user equipment capable of executing dual connectivity in a communication network, and includes a wireless interface circuit that simultaneously communicates with two communication networks, where URLLC (ultra-reliable, low latency communication) is operated in both of the two communication networks, and a control circuit that determines that the URLLC transmission is necessary regarding both of the two communication networks. The control circuit decides to use reserved power of each of the two communication networks for the URLLC transmission to the two communication networks, respectively, instead of using reserved power of another communication network. The wireless interface circuit transmits signals of the URLLC over the two communication networks, using the reserved power of each of the two communication networks.

In another general embodiment, a method is provided that is an execution method of dual connectivity in a communication network, the method including: communicating with two communication networks, where URLLC (ultra-reliable, low latency communication) is operated in one of the two communication networks; determining that the URLLC transmission is necessary regarding the one communication network, and that the URLLC is not operated in another communication network of the two communication networks; deciding to use a first reserved power of the one communication network, and a second reserved power of the other communication network in which the URLLC is not operated, for transmission of the URLLC as to the one communication network where the URLLC transmission is necessary; and transmitting signals of the URLLC over the one communication network, using the first reserved power and the second reserved power.

In another general embodiment, a method is provided that is an execution method of dual connectivity in a communication network, the method including: communicating with two communication networks, where URLLC (ultra-reliable, low latency communication) is operated in both of the two communication networks; determining that the URLLC transmission is necessary regarding both of the two communication networks; deciding to use reserved power of each of the two communication networks for transmission of the URLLC to the two communication networks, respectively, instead of using reserved power of another communication network; and transmitting signals of the URLLC over the two communication networks, using the reserved power of each of the two communication networks.

It should be noted that these general or specific embodiments may be implemented as a system, a device, a method, an integrated circuit, a computer program, or a recording medium, and may be realized by any combination of a system, device, method, integrated circuit, computer program, and recording medium.

According to an embodiment of the present disclosure, efficient power use can be realized in URLLC supporting dual connectivity.

Additional benefits and advantages of an embodiment of the present disclosure will become apparent from the specification and drawings. The benefits and/or advantages are individually obtained by the various embodiments and features described in the specification and drawings, which need not all be provided in order to yield one or more of such features.

BRIEF DESCRIPTION OF DRAWINGS

FIG. 2A illustrates a configuration example of the user equipment 100 connected to base stations 200 and 300 according to the embodiment.

DESCRIPTION OF EMBODIMENTS

Figure 1:
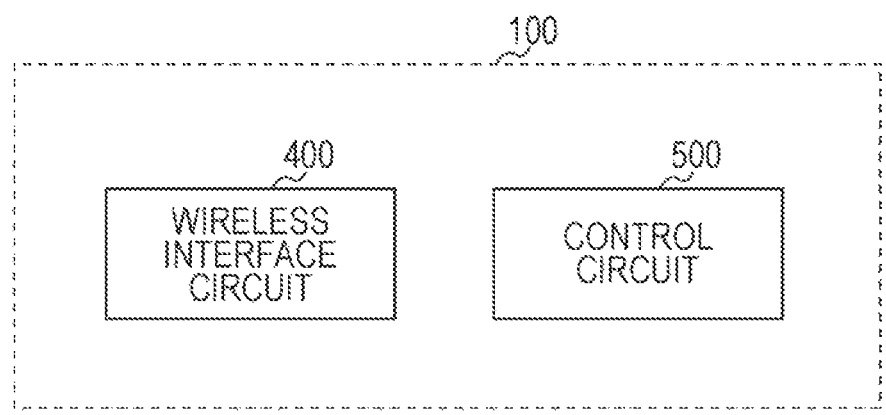
FIG. 1 illustrates the configuration of part of user equipment 100 according to an embodiment.

An embodiment will be described below with reference to drawings relating to a communication method, device, and system. The present technology may be carried out in various forms and in various orders, and should not be interpreted as being limited to the embodiment described below. Rather, these embodiments are provided so that the present disclosure will be complete in detail, and that the present technology will be sufficiently understood by one skilled in the art. As a matter of fact, the present technology is intended to cover substitutions, modifications, and equivalencies to the present embodiment, which are included in the scope and spirit of the technology set forth in the attached claims. Also, many specific details are described in the detailed description of the present technology below, to facilitate understanding of the present technology in a sure manner. However, it will be clear to one skilled in the art that the present technology can be carried out even without such details.

Although orders of processes in a method and structures of components are provided here, these are intended to be exemplary, and are not intended to restrict the present disclosure. The detailed description of technology below is presented for the purpose of exemplification and description. The following description is not intended to be exhaustive or to restrict technology to a strict disclosed form. Many modifications or variations may be made based on the above-stated understanding. The embodiment that is described has been selected as being optimal in describing technical principles and actual application, and one skilled in the art can use the present technology through various embodiments and various modifications to configure so as to match particular usage purposes that are intended. The scope of the present technology is defined in the attached claims.

A communication system according to embodiments of the present disclosure has a user equipment 100, and a base station 200 and base station 300. The user equipment 100 can execute dual connectivity.

During dual connectivity, there are cases where the user equipment 100 is connected to two communication networks (the base station 200 and base station 300 here) in order to use more resources. Note that while the communication networks are represented by the base stations 200 and 300, these are not limited to base stations.

The base stations 200 and 300 described below are LTE-NR network dual connectivity base stations, as one example. That is to say, one of the base station 200 and base station 300 configures an LTE cell, and the other configures an NR cell. Note however, that the present disclosure is not limited to LTE-NR dual connectivity. The embodiment disclosed here can be realized in any preferred communication system that supports dual connectivity.

Also, URLLC is ultra-reliable and low latency communication, and is an indispensable feature for many MTC applications and mission-critical services, as described above. Also, URLLC is an indispensable feature for other communication services besides URLLC such as eMBB, mMTC, and so forth, and other services unrelated to URLLC. Note that in the present disclosure, communication services other than URLLC are not limited to eMBB and mMTC, and may be any communication services other than URLLC.

An uplink transmission power control method (allocation method) regarding URLLC during execution of dual connectivity will be described in detail in the present embodiment.

FIG. 1 is a block diagram illustrating a partial configuration of the user equipment 100 according to an embodiment of the present disclosure. The user equipment 100 illustrated in FIG. 1 is user equipment that can execute dual connectivity in a communication network. In the user equipment 100, a wireless interface circuit 400 simultaneously communicates with two communication networks (base station 200 and base station 300). Note that URLLC (ultra-reliable, low latency communication) is operated in one of the two communication networks. A control circuit 500 determines that URLLC transmission is necessary for one communication network, and URLLC is not operated in the other communication network of the two communication networks. In this case, the control circuit 500 decides to use a first reserved power of the one communication network, and a second reserved power for the other communication network where URLLC is not operated, for transmission of URLLC to the one communication network where URLLC transmission is necessary. The wireless interface circuit 400 then transmits URLLC signals over the one communication network using the first reserved power and the second reserved power.

FIG. 2A illustrates an example of a block diagram of the user equipment 100 connected to the base stations 200 and 300 according to the embodiment of the present disclosure.

The user equipment 100 illustrated in FIG. 2A includes the wireless interface circuit 400 and the control circuit 500.

The wireless interface circuit 400 has a receiver interface circuit 400a and a transmitter interface circuit 400b.

The user equipment 100 is simultaneously connected to the base station 200 and base station 300 through the wireless interface circuit 400. That is to say, the user equipment 100 executes dual connectivity to the base station 200 and base station 300.

That is to say, the wireless interface circuit 400 performs communication simultaneously with two communication networks (base station 200 and base station 300). Specifically, the receiver interface circuit 400a receives downlink signals transmitted from the base station 200 or the base station 300. The transmitter interface circuit 400b transmits uplink signals to the base station 200 or base station 300.

The maximum power for uplink transmission at the user equipment 100 is limited to RF (Radio Frequency) capabilities of the user equipment (wireless interface circuit 400, etc.). According to the present embodiment, the user equipment 100 is allocated with uplink transmission reserved power for each of LTE and NR, as illustrated in FIG. 2B (see Before).

Figure 2B:
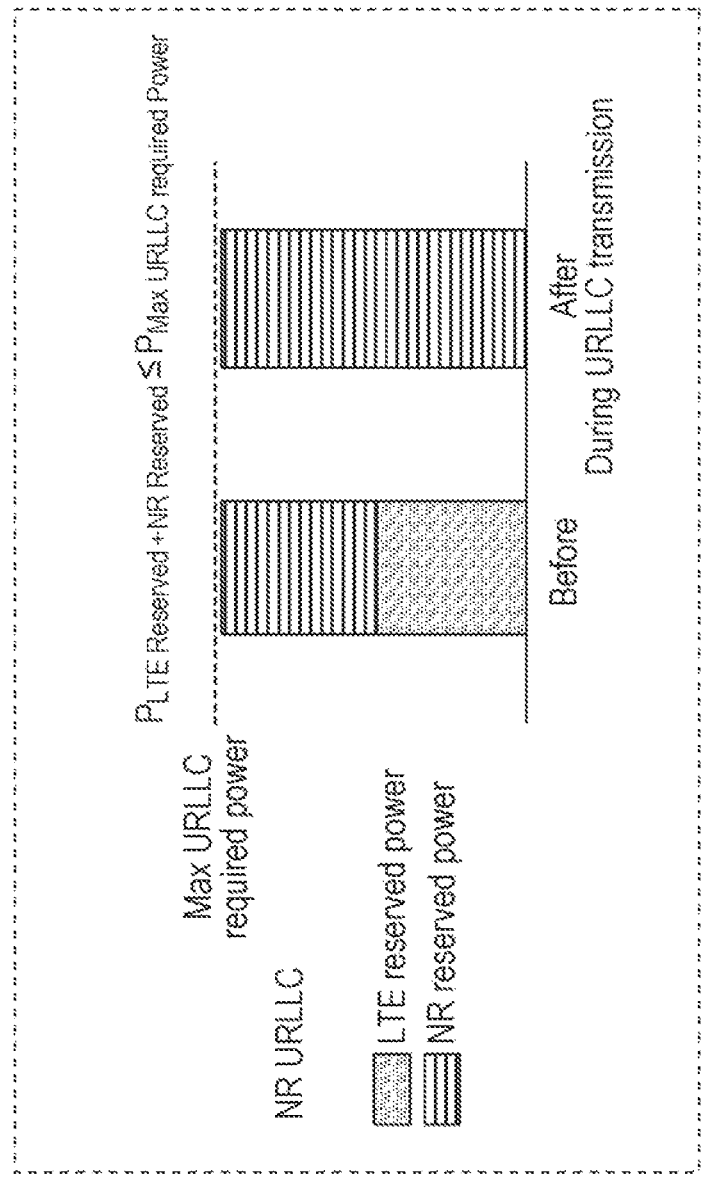
FIG. 2B illustrates an example of power utilization in LTE-NR dual connectivity during URLLC transmission according to the embodiment.

According to FIG. 2B, a relation of $P_{LTE\ Reserved+NR\ Reserved} \leq P_{Max\ URLLC\ required\ Power}$ is satisfied. For example, $P_{LTE\ Reserved+NR\ Reserved} = P_{LTE\ Reserved} + P_{NR\ Reserved}$. Here, $P_{LTE\ Reserved}$ is reserved power allocated for uplink transmission to an LTE cell (LTE reserved power), and $P_{NR\ Reserved}$ is reserved power allocated for uplink transmission to an NR cell (NR reserved power). The reserved power is allocated so as to be equal to or smaller than $P_{Max\ URLLC\ required\ Power}$ that is the maximum power necessary for URLLC transmission. The reserved power is signaled to the user equipment 100 by a base station (base station 200 or base station 300). The present disclosure is not limited to an option where reserved power is dynamically set, and the reserved power can be quasi-statically signaled. Further, the present embodiment can be applied to other methods or setting methods, and transmission of reserved power.

In the user equipment 100, the control circuit 500 also has a transmission determining circuit 500a and a power level determining circuit 500b.

The transmission determining circuit 500a of the user equipment 100 determines whether or not uplink transmission in URLLC is necessary in an NR cell, and also communication other than URLLC is in operation in an LTE cell. Note that uplink signals in URLLC (hereinafter may also be referred to as URLLC signals) may include URLLC control information and/or URLLC data information.

In a case where the transmission determining circuit 500a has determined that uplink transmission in URLLC is necessary in the NR cell, and also communication other than URLLC is in operation in the LTE cell, the power level determining circuit 500b determines power to be used for uplink transmission in URLLC in the NR cell. In this case, the power level determining circuit 500b decides to use reserved power for LTE, in addition to reserved power for NR, for URLLC transmission in the NR cell, as illustrated in FIG. 2B (see After). In this case, the transmitter interface circuit 400b transmits URLLC signals to the NR cell using reserved power for NR and reserved power for LTE (i.e., using the reserved power of both as reserved power for NR) as illustrated in FIG. 2B (see After).

Thus, in LTE-NR dual connectivity, in a case where the user equipment 100 performs URLLC in the NR cell, and URLLC is not in operation in the LTE cell, uses the reserved power for NR and the reserved power for LTE for URLLC transmission to the NR cell. That is to say, both the reserved power for LTE and reserved power for NR are used in the user equipment 100 for URLLC transmission. In other words, power utilization regarding URLLC is given priority over other communication (LTE here) at the user equipment 100, and reserved power is not guaranteed for this other communication during URLLC transmission.

Accordingly, the power utilization for URLLC transmission in NR can be maximized, and can be executed more efficiently with low latency. As a result, URLLC transmission which carries critical information is more reliably executed with efficient power sharing and utilization.

Note that the user equipment 100, base station 200, and base station 300 may have several conventional circuits to execute conventional operations, in addition to the configuration illustrated in FIG. 2A.

Figure 3:
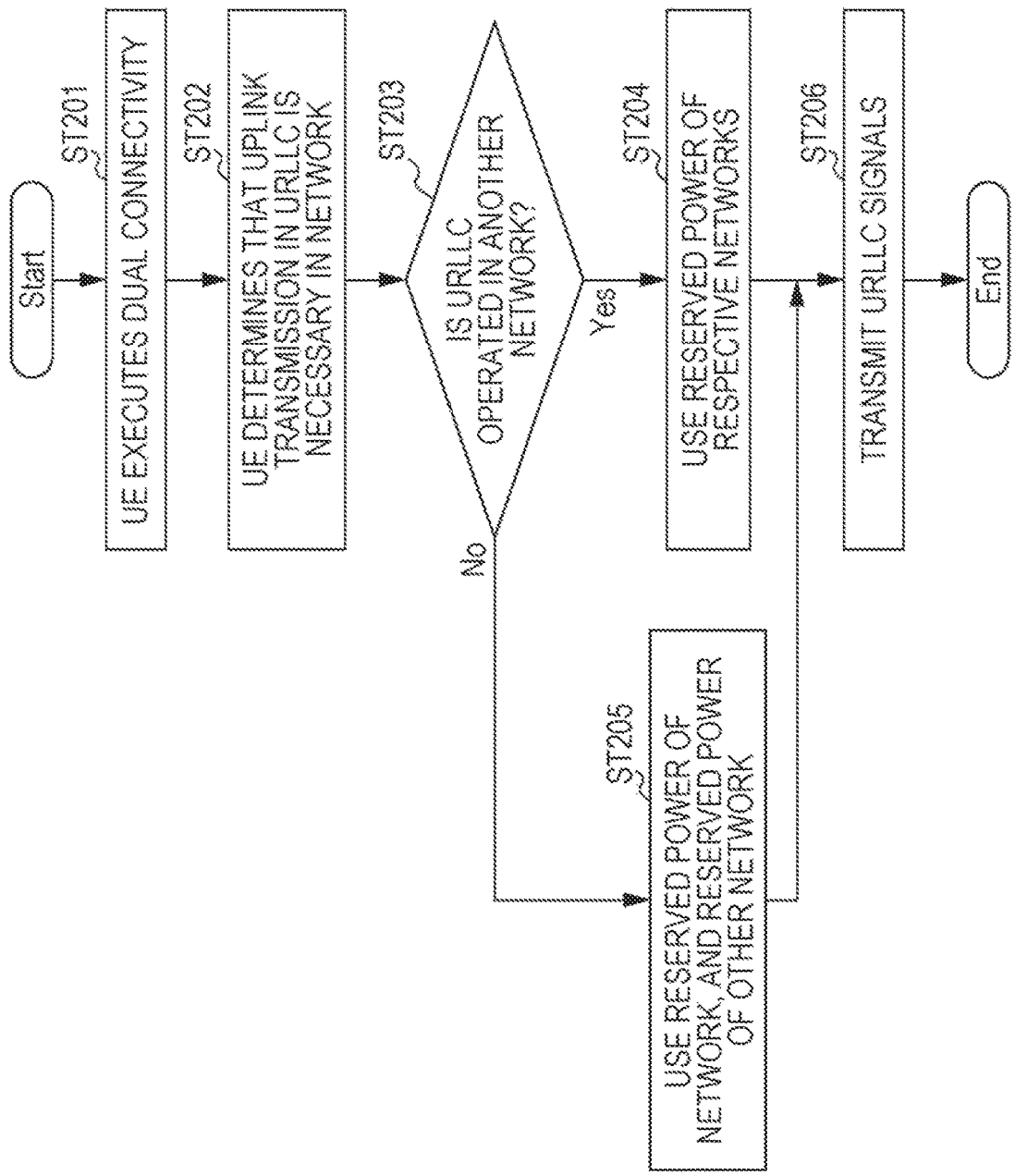
FIG. 3 illustrates an example of a flowchart for power utilization in URLLC uplink transmission between user equipment and a base station according to the embodiment.

FIG. 3 is a diagram illustrating an example of a flowchart for power utilization for uplink transmission, among the user equipment 100 and base stations 200 and 300 according to an embodiment of the present disclosure.

In ST201, the user equipment 100 (UE) is simultaneously connected to both the base station 200 and base station 300, as illustrated in FIG. 2. That is to say, the user equipment 100 executes LTE-NR dual connectivity.

The user equipment 100 determines the necessity of operation of URLLC (uplink transmission) in the NR cell (i.e., the one communication network) in ST202. The user equipment 100 here has determined that uplink transmission in URLLC is necessary in the NR cell.

The user equipment 100 determines in ST203 whether or not URLLC is operated in another communication network. In other words, the user equipment 100 determines whether or not communication other than URLLC is operated in another communication network (LTE cell here). That is to say, the user equipment 100 determines in ST202 and ST203 whether or not uplink transmission in URLLC is necessary in the NR cell, and URLLC is not operated in the LTE cell.

In a case where URLLC is operated in another communication network (ST203: Yes), the user equipment 100 uses the reserved power allocated to each of the communication networks (NR cell and LTE cell) (see Before in FIG. 2B) for URLLC transmission in each of the communication networks in ST204. That is to say, in ST204, the user equipment 100 determines that URLLC transmission to both of the two communication networks is necessary, and decides to use the reserved power of each of the two communication networks for respective URLLC transmission to each of the communication networks, instead of using reserved power of the other communication network.

On the other hand, in a case where URLLC is not operated in another communication network (ST203: No), in ST205 the user equipment 100 decides to use reserved power of the LTE where URLLC is not operated for URLLC transmission in the NR in addition to the reserved power of the NR where URLLC transmission is necessary (e.g., see After in FIG. 2B), in order to maximize uplink transmission power for URLLC transmission. That is to say, in ST205, URLLC is operated in one of the communication networks, so the user equipment 100 determines to use the reserved power of each of the communication networks in the one communication network where URLLC is operated.

In ST206, the user equipment 100 transmits URLLC signals to at least the NR cell.

Thus, according to the present embodiment, in a case where URLLC is operated in any one of communication networks (cell groups) where concurrent communication is performed by dual connectivity, and URLLC is not operated in the other communication network, the reserved power of both communication networks is shared (used) in the user equipment 100 to transmit URLLC signals. Accordingly, uplink transmission for URLLC is strengthened, and ultra-reliable and low latency communication can be achieved.

Note that LTE communication may generally be classified as eMBB, with URLLC unsupported. In this case, determination is not made that URLLC is operated in another network (LTE cell) in ST203 in FIG. 3, for example. Accordingly, in a case where URLLC is not supported by LTE, during execution of LTE-NR dual connectivity the user equipment 100 may execute the processing of ST205 and ST206 after the processing of ST202 in FIG. 3, without performing the processing of ST203 and ST204. Note that operations in a case where URLLC services are also operated by LTE will be described in detail in Modification 2 as well.

(Modification 1)

There are cases where uplink transmission in URLLC is transmission of control information for URLLC. Control information conveys information of greatest importance as to a base station (base stations 200, 300), so there is need for the base station to receive control information for URLLC in a sure manner with low latency as in the embodiment described above, and to efficiently decode URLLC data. Note that a HARQ process can be applied regarding URLLC data.

There also is a case where uplink transmission in URLLC is transmission of URLLC control information including a scheduling request (SR: Scheduling Request) or a HARQ-ACK/NACK (response signal). Control information conveys information of greatest importance as to a base station (base stations 200, 300), so the base station efficiently decodes URLLC data by receiving control information for URLLC that conveys at least a scheduling request (SR) or HARQ-ACK/NACK in a sure manner, with low latency as in the embodiment described above. Note that there are cases where a HARQ process is applied regarding other URLLC control information besides SR and HARQ-ACK/NACK, and URLLC data.

(Modification 2)

The above-described embodiment illustrated in FIG. 2A and FIG. 3 (LTE-NR dual connectivity) can also be applied to other dual connectivity communication networks as well. Various forms of dual connectivity will be described in Modification 2 as an example.

Note that in the following description, of the base stations 200 and 300 to which the user terminal 100 executing dual connectivity connects simultaneously, the MeNB or master cell group (MCG) will be referred to simply as "master", and the SeNB or secondary cell group (SCG) will be referred to simply as "secondary".

Now, forms of dual connectivity include (i) a case where an NR cell is the master and an LTE cell is the secondary, (ii) a case where an NR cell is the secondary and an LTE cell is the master, (iii) a case where an NR cell is the master and an NR cell is the secondary (NR-NR dual connectivity), (iv) a case where an LTE cell is the master and an LTE cell is the secondary (LTE-LTE dual connectivity), and so forth.

URLLC is operated in the master or secondary. In a case of URLLC transmission, reserved power of another communication network where communication other than URLLC is operated can be used (shared) in the user equipment 100 in a communication network where URLLC is operated, as described above.

Also, URLLC service is a communication service being currently studied for NR. However, it is conceivable that URLLC service will also be operated in LTE in the future. Accordingly, power utilization in a scenario where URLLC service is operated in LTE will be handled in the present disclosure as well.

A power utilization method in dual connectivity of the above-described cases (i) through (iv) will be described below as an example.

[Case (i) (FIG. 4A and FIG. 4B)]

In case (i), an NR cell is set as the master (referred to as "NR master") and an LTE cell is set as the secondary (referred to as "LTE secondary") in LTE-NR dual connectivity.

The user equipment 100 having structure similar to FIG. 2A is simultaneously connected to both the NR master and LTE secondary. The maximum power during uplink transmission at the user equipment 100 is limited to the RF capabilities of the user equipment 100. The user equipment 100 is allocated with uplink transmission reserved power for each of LTE and NR here, as in the above embodiment (see Before in FIG. 4A).

The user equipment 100 (transmission determining circuit 500a) here determines that uplink transmission for URLLC is necessary in the NR master, and determines that communication other than URLLC is operated in the LTE secondary (i.e., ST203: No in FIG. 3). Note that URLLC signals may include URLLC control information and/or URLLC data information.

In a case where the transmission determining circuit 500a has determined that uplink transmission for URLLC is necessary in the NR master, and that communication other than URLLC is operated in the LTE secondary, the user equipment 100 (power level determining circuit 500b) decides power to be used for uplink transmission for URLLC in the NR master. Specifically, the power level determining circuit 500b decides to use the reserved power of the LTE secondary in addition to the reserved power of the NR master for URLLC transmission in the NR master (ST205 in FIG. 3) (see After in FIG. 4A). The user equipment 100 (transmitter interface circuit 400b) transmits URLLC signals in the NR master using reserved power of the NR master and reserved power of the LTE secondary.

Figure 4A:
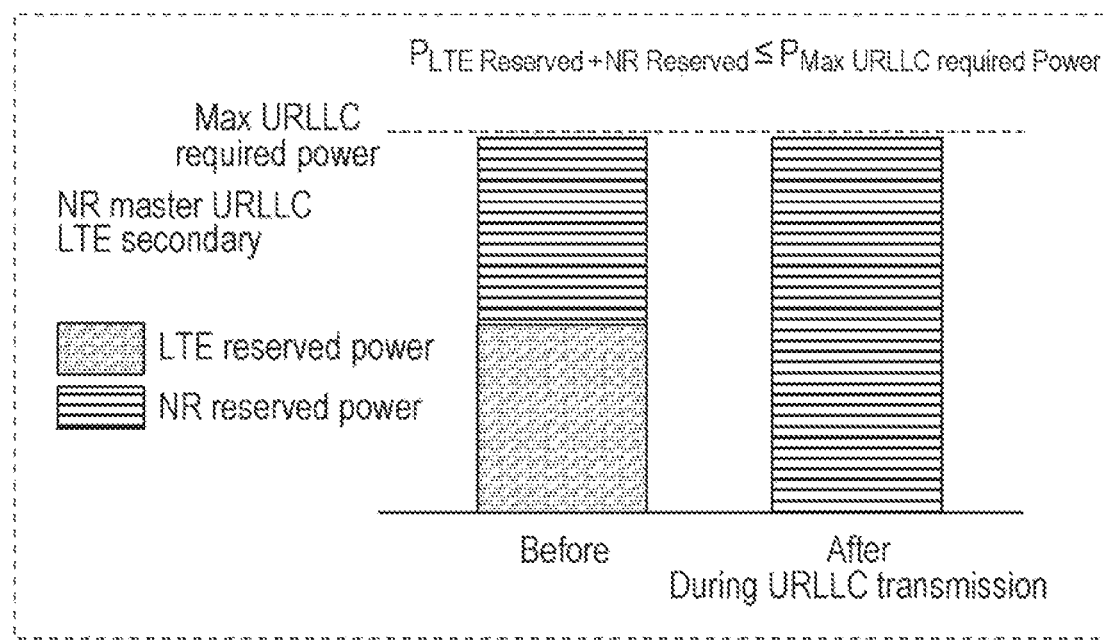
FIG. 4A illustrates an example of power utilization in LTE-NR dual connectivity during URLLC transmission according to Modification 2 of the embodiment.

The user equipment 100 can use the reserved power of the LTE secondary during URLLC transmission in the NR master as illustrated in FIG. 4A, so URLLC in the NR master is efficiently executed by maximizing power utilization with low latency. As a result, URLLC transmission which carries critical information is more reliably executed with efficient power sharing and utilization.

Next, as a different form of case (i), the user equipment 100 (transmission determining circuit 500a) determines that uplink transmission for URLLC is necessary in the LTE secondary, and determines that communication other than URLLC is operated in the NR.

In a case where the transmission determining circuit 500a has determined that uplink transmission for URLLC is necessary in the LTE secondary, and that communication other than URLLC is operated in the NR master, the user equipment 100 (power level determining circuit 500b) decides power to be used for uplink transmission for URLLC in the LTE secondary. Specifically, the power level determining circuit 500b decides to use the reserved power of the NR master in addition to the reserved power of the LTE secondary for URLLC transmission in the LTE secondary (see After in FIG. 4B). The user equipment 100 (transmitter interface circuit 400b) transmits URLLC in the LTE secondary using reserved power of the LTE secondary and reserved power of the NR master.

Figure 4B:
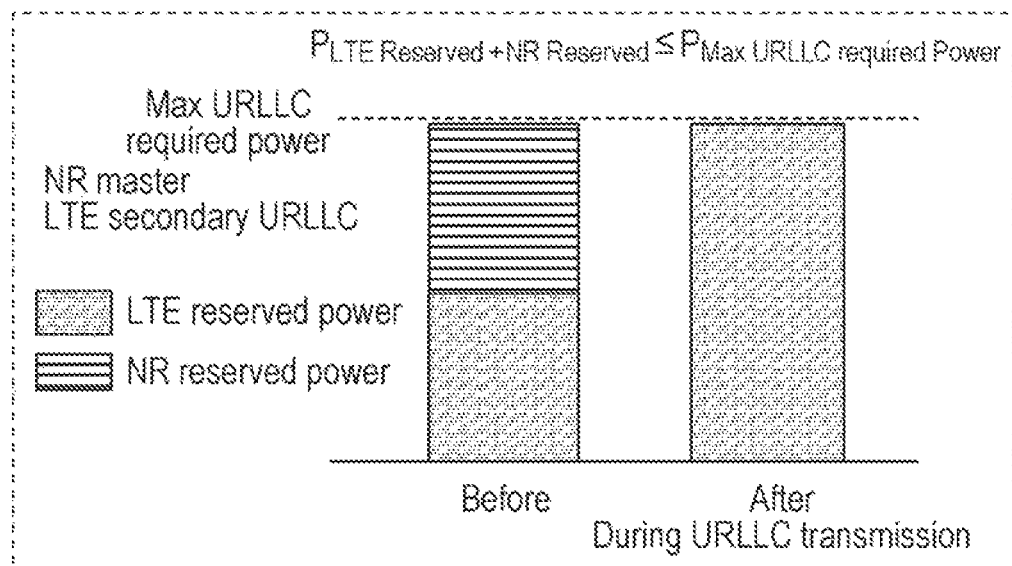
FIG. 4B illustrates an example of power utilization in LTE-NR dual connectivity during URLLC transmission according to Modification 2 of the embodiment.

The user equipment 100 can use the reserved power of the NR master during URLLC transmission in the LTE secondary as illustrated in FIG. 4B, so URLLC in the LTE secondary is efficiently executed by maximizing power utilization with low latency. As a result, URLLC transmission which carries critical information is more reliably executed with efficient power sharing and utilization.

[Case (ii) (FIG. 4C and FIG. 4D)]

In case (ii), an NR cell is set as the secondary (referred to as "NR secondary") and an LTE is set as the master (referred to as "LTE master") in LTE-NR dual connectivity.

The user equipment 100 having structure similar to FIG. 2A is simultaneously connected to both the NR secondary and LTE master. The maximum power during uplink transmission at the user equipment 100 is limited to the RF capabilities of the user equipment 100. The user equipment 100 is allocated with uplink transmission reserved power for each of LTE and NR here, as in the above embodiment (see Before in FIG. 4C).

The user equipment 100 (transmission determining circuit 500a) here determines that uplink transmission for URLLC is necessary in the LTE master, and determines that communication other than URLLC is operated in the NR secondary (i.e., ST203: No in FIG. 3). Note that URLLC signals may include URLLC control information and/or URLLC data information.

In a case where the transmission determining circuit 500a has determined that uplink transmission for URLLC is necessary in the LTE master, and that communication other than URLLC is operated in the NR secondary, the user equipment 100 (power level determining circuit 500b) decides power to be used for uplink transmission for URLLC in the LTE master. Specifically, the power level determining circuit 500b decides to use the reserved power of the NR secondary in addition to the reserved power of the LTE master for URLLC transmission in the LTE master (ST205 in FIG. 3) (see After in FIG. 4C). The user equipment 100 (transmitter interface circuit 400b) transmits URLLC signals in the LTE master using reserved power of the LTE master and reserved power of the NR secondary.

Figure 4C:
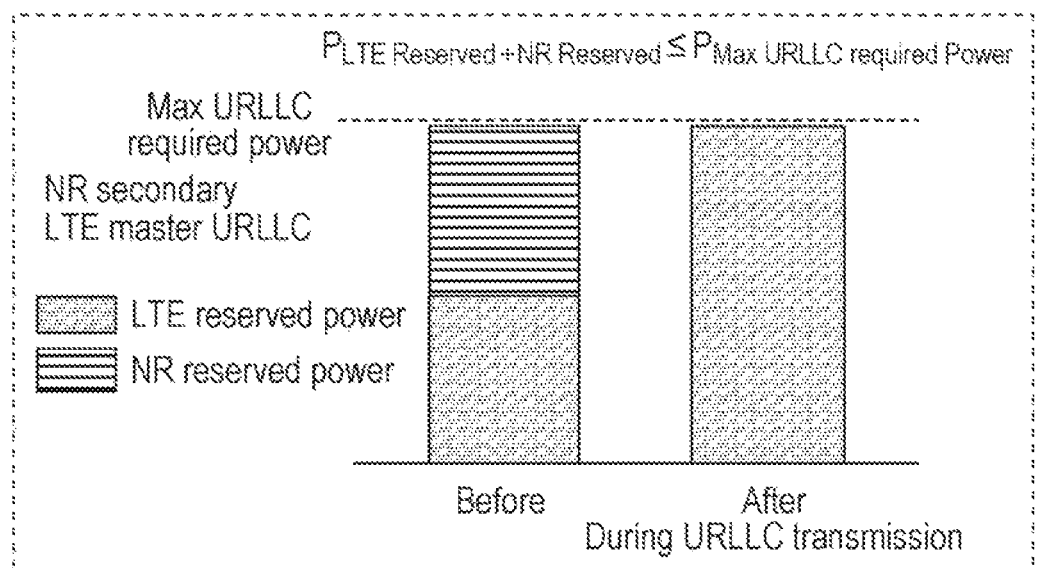
FIG. 4C illustrates an example of power utilization in LTE-NR dual connectivity during URLLC transmission according to Modification 2 of the embodiment.

The user equipment 100 can use the reserved power of the NR secondary during URLLC transmission in the LTE master as illustrated in FIG. 4C, so URLLC in the LTE master is efficiently executed by maximizing power utilization with low latency. As a result, URLLC transmission which carries critical information is more reliably executed with efficient power sharing and utilization.

Next, as a different form of case (ii), the user equipment 100 (transmission determining circuit 500a) determines that uplink transmission for URLLC is necessary in the NR secondary, and determines that communication other than URLLC is operated in the LTE master.

In a case where the transmission determining circuit 500a has determined that uplink transmission for URLLC is necessary in the NR secondary, and that communication other than URLLC is operated in the LTE master, the user equipment 100 (power level determining circuit 500b) decides power to be used for uplink transmission for URLLC in the NR secondary. Specifically, the power level determining circuit 500b decides to use the reserved power of the LTE master in addition to the reserved power of the NR secondary for URLLC transmission in the NR secondary (see After in FIG. 4D). The user equipment 100 (transmitter interface circuit 400b) transmits URLLC signals in the NR secondary using reserved power of the NR secondary and reserved power of the LTE master.

Figure 4D:
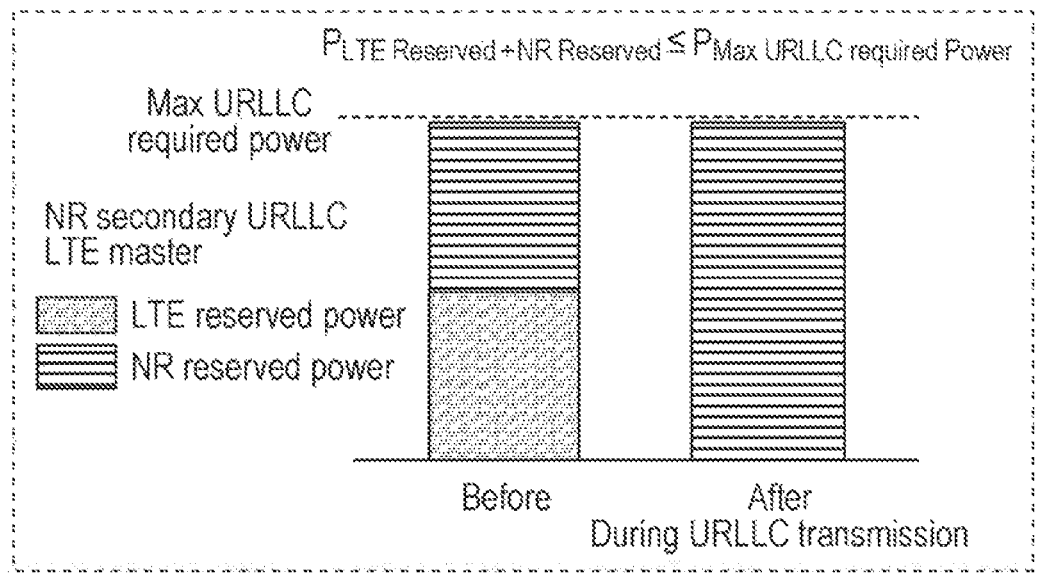
FIG. 4D illustrates an example of power utilization in LTE-NR dual connectivity during URLLC transmission according to Modification 2 of the embodiment.

The user equipment 100 can use the reserved power of the LTE master during URLLC transmission in the NR secondary as illustrated in FIG. 4D, so URLLC in the NR secondary is efficiently executed by maximizing power utilization with low latency. As a result, URLLC transmission which carries critical information is more reliably executed with efficient power sharing and utilization.

[Case (iii) (FIG. 5A and FIG. 5B)]

In case (iii), an NR1 cell is set as the master (referred to as "NR1 master") and an NR2 cell is set as the secondary (referred to as "NR2 secondary") in NR-NR dual connectivity.

The user equipment 100 having structure similar to FIG. 2A is simultaneously connected to both the NR1 master and NR2 secondary. The maximum power during uplink transmission at the user equipment 100 is limited to the RF capabilities of the user equipment 100. The user equipment 100 is allocated with uplink transmission reserved power for each of NR1 and NR2 here, as in the above embodiment (see Before in FIG. 5A).

The user equipment 100 (transmission determining circuit 500a) here determines that uplink transmission for URLLC is necessary in the NR1 master, and determines that communication other than URLLC is operated in the NR2 secondary (i.e., ST203: No in FIG. 3). Note that URLLC signals may include URLLC control information and/or URLLC data information.

In a case where the transmission determining circuit 500a has determined that uplink transmission for URLLC is necessary in the NR1 master, and that communication other than URLLC is operated in the NR2 secondary, the user equipment 100 (power level determining circuit 500b) decides power to be used for uplink transmission for URLLC in the NR1 master. Specifically, the power level determining circuit 500b decides to use the reserved power of the NR2 secondary in addition to the reserved power of the NR1 master for URLLC transmission in the NR1 master (ST205 in FIG. 3) (see After in FIG. 5A). The user equipment 100 (transmitter interface circuit 400b) transmits URLLC signals in the NR1 master using reserved power of the NR1 master and reserved power of the NR2 secondary.

Figure 5A:
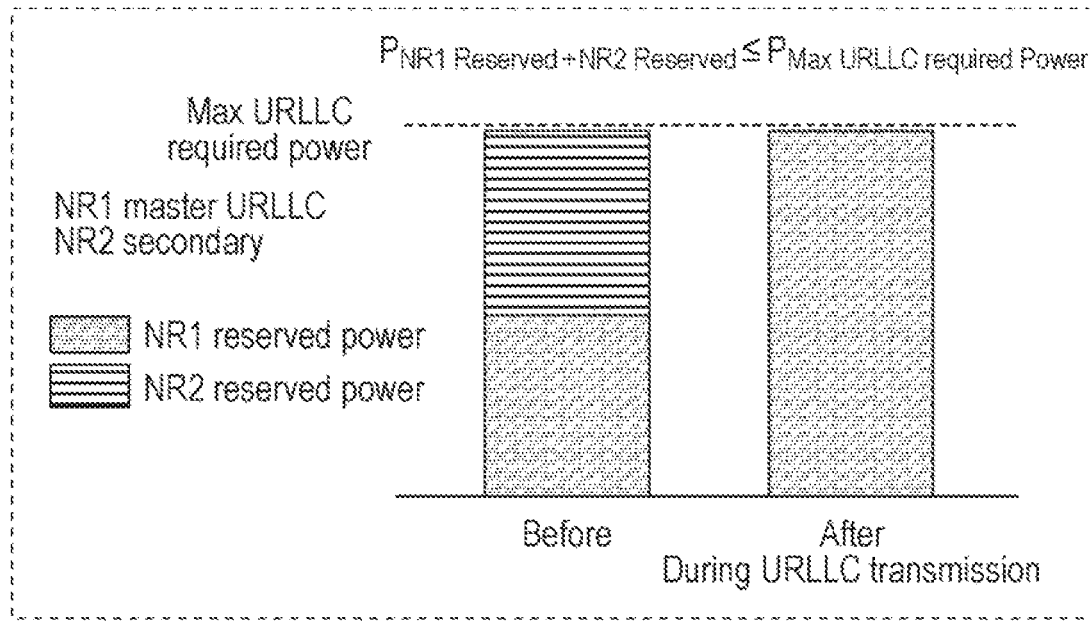
FIG. 5A illustrates an example of power utilization in NR-NR dual connectivity during URLLC transmission according to Modification 2 of the embodiment.

The user equipment 100 can use the reserved power of the NR2 secondary during URLLC transmission in the NR1 as illustrated in FIG. 5A, so URLLC in the NR1 master is efficiently executed by maximizing power utilization with low latency. As a result, URLLC transmission which carries critical information is more reliably executed with efficient power sharing and utilization.

Next, as a different form of case (iii), the user equipment 100 (transmission determining circuit 500a) determines that uplink transmission for URLLC is necessary in the NR2 secondary, and determines that communication other than URLLC is operated in the NR1 master. In this case, the user equipment 100 (power level determining circuit 500b) decides to use the reserved power of the NR1 master in addition to the reserved power of the NR2 secondary (see After in FIG. 5B) for URLLC transmission in the NR2 secondary. The user equipment 100 (transmitter interface circuit 400b) transmits URLLC signals in the NR2 secondary using reserved power of the NR2 secondary and reserved power of the NR1 master.

Figure 5B:
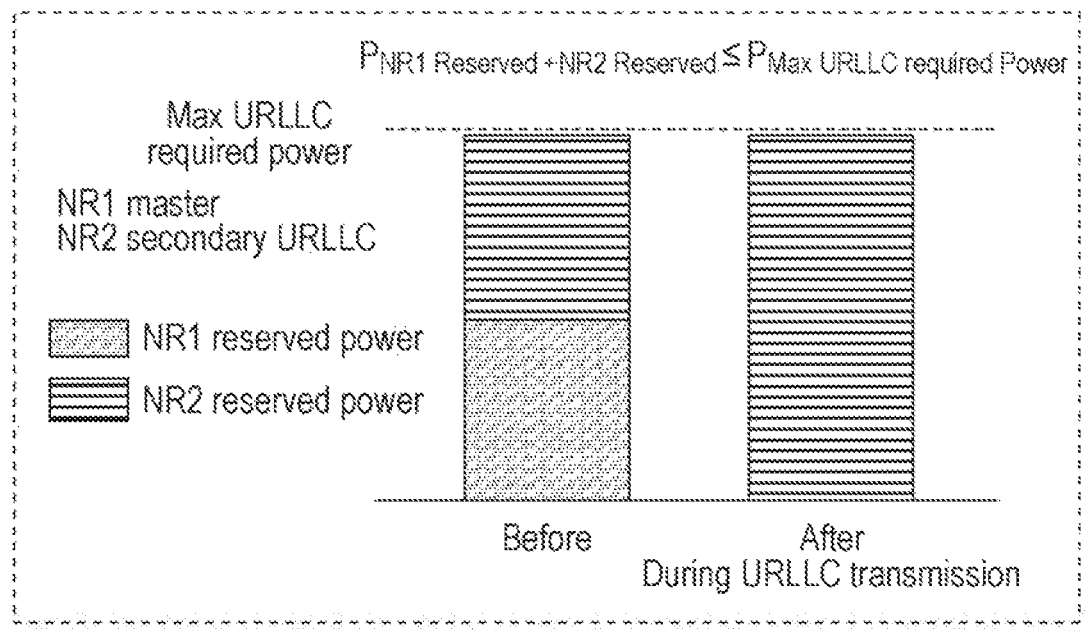
FIG. 5B illustrates an example of power utilization in NR-NR dual connectivity during URLLC transmission according to Modification 2 of the embodiment.

The user equipment 100 can use the reserved power of the NR1 master during URLLC transmission in the NR2 secondary as illustrated in FIG. 5B, so URLLC in the NR2 secondary is efficiently executed by maximizing power utilization with low latency. As a result, URLLC transmission which carries critical information is more reliably executed with efficient power sharing and utilization.

In this way, the base station 200 and base station 300 are NR1 and NR2 in NR-NR dual connectivity. NR1 is the master and NR2 is the secondary, or vice versa. Also, URLLC is operated in one of the master and secondary. During URLLC transmission, the user equipment 100 can use reserved power of another communication network where communication other than URLLC is operated, as transmission power for URLLC.

[Case (iv) (FIG. 6A and FIG. 6B)]

In case (iv), an LTE1 cell is set as the master (referred to as "LTE1 master") and an LTE2 cell is set as the secondary (referred to as "LTE2 secondary") in LTE-LTE dual connectivity.

The user equipment 100 having structure similar to FIG. 2A is simultaneously connected to the LTE1 master and LTE2 secondary. The maximum power during uplink transmission in the user equipment 100 is limited to the RF capabilities of the user equipment 100. The user equipment 100 is allocated with uplink transmission reserved power for each of LTE1 and LTE2 here, as in the above embodiment (see Before in FIG. 6A).

The user equipment 100 (transmission determining circuit 500a) here determines that uplink transmission for URLLC is necessary in the LTE1 master, and determines that communication other than URLLC is operated in the LTE2 secondary (i.e., ST203: No in FIG. 3). Note that URLLC signals may include URLLC control information and/or URLLC data information.

In a case where the transmission determining circuit 500a has determined that uplink transmission for URLLC is necessary in the LTE1 master, and that communication other than URLLC is operated in the LTE2 secondary, the user equipment 100 (power level determining circuit 500b) decides power to be used for uplink transmission for URLLC in the LTE1 master. Specifically, the power level determining circuit 500b decides to use the reserved power of the LTE2 secondary in addition to the reserved power of the LTE1 master (ST205 in FIG. 3) (see After in FIG. 6A) for URLLC transmission in the LTE1 master. The user equipment 100 (transmitter interface circuit 400b) transmits URLLC signals in the LTE1 master using reserved power of the LTE1 master and reserved power of the LTE2 secondary.

Figure 6A:
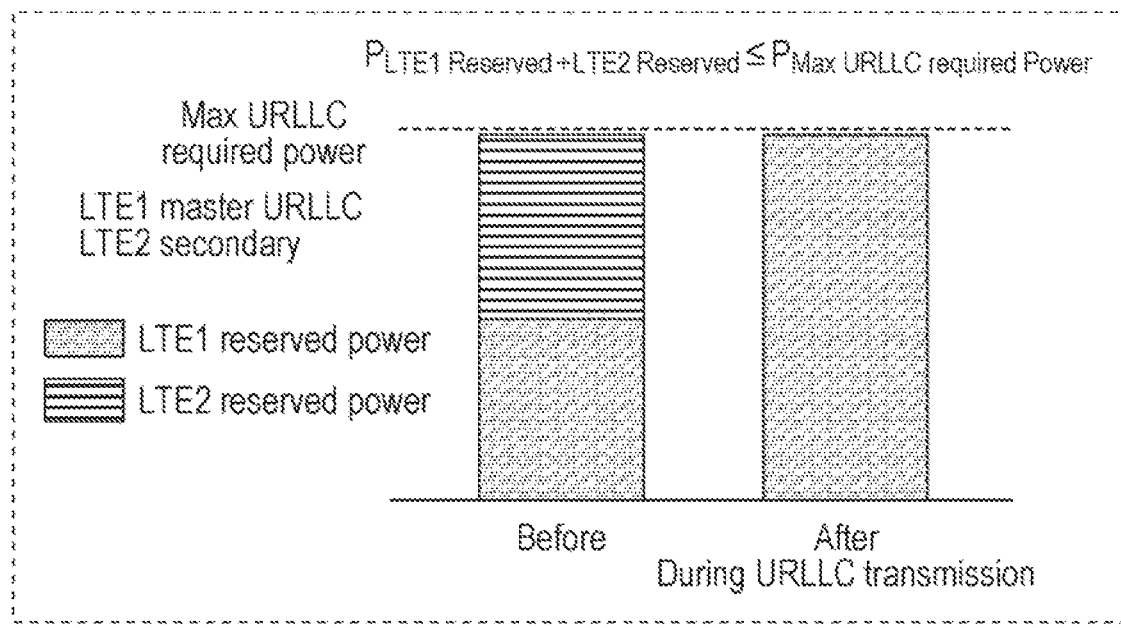
FIG. 6A illustrates an example of power utilization in LTE-LTE dual connectivity during URLLC transmission according to Modification 2 of the embodiment.

The user equipment 100 can use the reserved power of the LTE2 secondary during URLLC transmission in the LTE1 master as illustrated in FIG. 6A, so URLLC transmission in the LTE1 master is efficiently executed by maximizing power utilization with low latency. As a result, URLLC transmission which carries critical information is more reliably executed with efficient power sharing and utilization.

Next, as a different form of case (iv), the user equipment 100 (transmission determining circuit 500a) determines that uplink transmission for URLLC is necessary in the LTE2 secondary, and determines that communication other than URLLC is operated in the LTE1 master. In this case, the user equipment 100 (power level determining circuit 500b) decides to use the reserved power of the LTE1 master in addition to the reserved power of the LTE2 secondary (see After in FIG. 6B) for URLLC transmission in the LTE2 secondary. The user equipment 100 (transmitter interface circuit 400b) transmits URLLC signals in the LTE2 secondary using reserved power of the LTE2 secondary and reserved power of the LTE1 master.

Figure 6B:
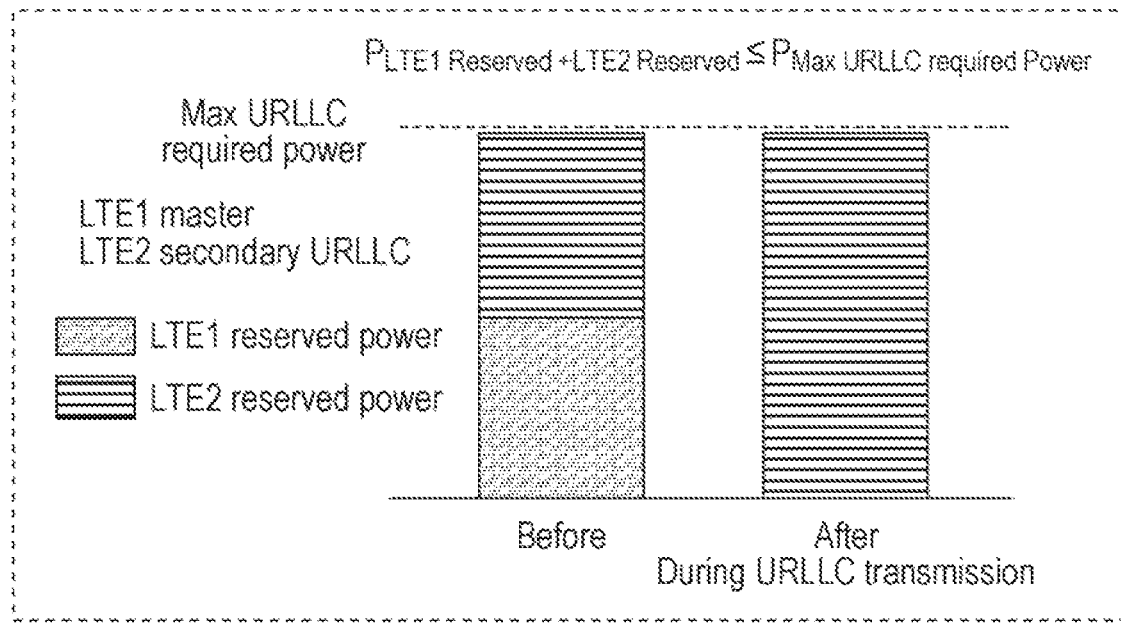
FIG. 6B illustrates an example of power utilization in LTE-LTE dual connectivity during URLLC transmission according to Modification 2 of the embodiment.

The user equipment 100 can use the reserved power of the LTE1 master during URLLC transmission in the LTE2 secondary as illustrated in FIG. 6B, so URLLC in the LTE2 secondary is efficiently executed by maximizing power utilization with low latency. As a result, URLLC transmission which carries critical information is more reliably executed with efficient power sharing and utilization.

In this way, the base station 200 and base station 300 are LTE1 and LTE2 in LTE-LTE dual connectivity. LTE1 is the master and LTE2 is the secondary, or vice versa. Also, URLLC is operated in one of the master and secondary. During URLLC transmission, the user equipment 100 can use reserved power of another communication network where communication other than URLLC is operated, as transmission power for URLLC.

[Modification 3]

A case will be described in Modification 3 where uplink transmission for URLLC is necessary in both the base station 200 and base station 300 connected to the user equipment 100 in dual connectivity (i.e., ST203: Yes in FIG. 3).

Description will be made below regarding a case (v) where an NR cell is the master and an NR cell is the secondary (NR-NR dual connectivity), a case (vi) where an LTE cell is the master and an LTE cell is the secondary (LTE-LTE dual connectivity), and a case (vii) where an NR cell is the master and an LTE cell is the secondary (LTE-NR dual connectivity), as an example.

[Case (v) (FIG. 7)]

In case (v), an NR1 cell is set as the master (referred to as "NR1 master") and an NR2 is set as the secondary (referred to as "NR2 secondary") in NR-NR dual connectivity.

The user equipment 100 having structure similar to FIG. 2A is simultaneously connected to the NR1 master and NR2 secondary. The maximum power during uplink transmission at the user equipment 100 is limited to the RF capabilities of the user equipment 100. The user equipment 100 is allocated with uplink transmission reserved power for each of NR1 and NR2 here, as in the above embodiment (see Before in FIG. 7).

The user equipment 100 (transmission determining circuit 500a) here determines that uplink transmission for URLLC is necessary in both the NR1 master and NR2 secondary. Note that URLLC signals may include URLLC control information and/or URLLC data information.

In this case, the user equipment 100 (power level determining circuit 500b) decides power to be used for uplink transmission for URLLC in the NR1 master and NR2 secondary (ST204 in FIG. 3). Specifically, the power level determining circuit 500b decides to use the reserved power of each of the NR1 master and NR2 secondary for URLLC transmission in the NR1 master and NR2 secondary, respectively, without using reserved power of another communication network (see After in FIG. 7). The user equipment 100 (transmitter interface circuit 400b) transmits respective URLLC signals in both the NR1 master and NR2 secondary, using the reserved power of the NR1 master and the NR2 secondary, respectively.

Figure 7:
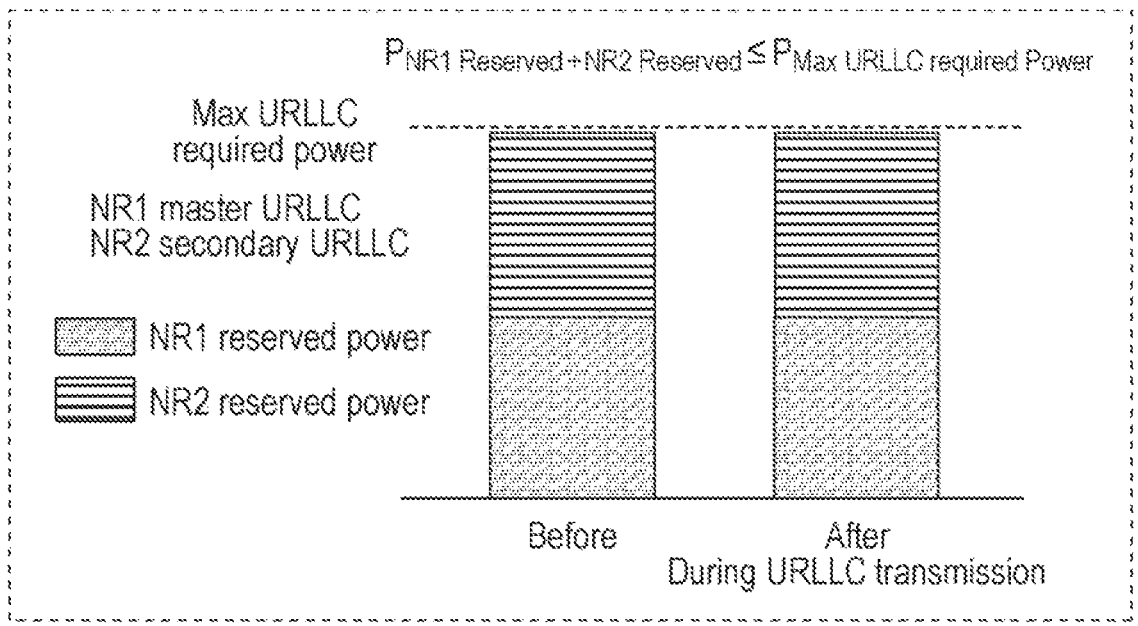
FIG. 7 illustrates an example of power utilization in NR-NR dual connectivity during URLLC simultaneous transmission according to Modification 3 of the embodiment.

The user equipment 100 can use the reserved power of each of the NR1 master and NR2 secondary, as illustrated in FIG. 7, so URLLC transmission is executed efficiently using power with low latency.

Note that in the NR-NR dual connectivity in case (v), the NR1 may be set as the secondary (NR1 secondary) and the NR2 may be set as the master (NR2 master) (omitted from illustration). In this case as well, in a case of having determined that uplink transmission for URLLC is necessary in the NR1 master and NR2 secondary, the user equipment 100 decides power to be used for uplink transmission for URLLC in the NR1 secondary and NR2 master, in the same way as described above. That is to say, the user equipment 100 decides to use the reserved power of each of the NR1 secondary and NR2 master for URLLC transmission in the NR1 secondary and NR2 master, respectively, in the same way as illustrated in FIG. 7. Accordingly, the user equipment 100 can use the reserved power of the NR1 secondary and NR2 master, so URLLC transmission is executed efficiently using power with low latency.

[Case (vi) (FIG. 8)]

In case (vi), an LTE1 cell is set as the master (referred to as "LTE1 master") and an LTE2 cell is set as the secondary (referred to as "LTE2 secondary") in LTE-LTE dual connectivity.

The user equipment 100 having structure similar to FIG. 2A is simultaneously connected to both the LTE1 master and LTE2 secondary. The maximum power during uplink transmission at the user equipment 100 is limited to the RF capabilities of the user equipment 100. The user equipment 100 is allocated with uplink transmission reserved power for each of LTE1 and LTE2 here, as in the above embodiment (see Before in FIG. 8).

The user equipment 100 (transmission determining circuit 500a) here determines that uplink transmission for URLLC is necessary in both the LTE1 master and LTE2 secondary. Note that URLLC signals may include URLLC control information and/or URLLC data information.

In this case, the user equipment 100 (power level determining circuit 500b) decides power to be used for uplink transmission for URLLC in the LTE1 master and LTE2 secondary (ST204 in FIG. 3). Specifically, the power level determining circuit 500b decides to use the reserved power of each of the LTE1 master and LTE2 secondary for URLLC transmission in the LTE1 master and LTE2 secondary, respectively, without using reserved power of another communication network (see After in FIG. 8). The user equipment 100 (transmitter interface circuit 400b) transmits respective URLLC signals in both the LTE1 master and LTE2 secondary, using the reserved power of the LTE1 master and the LTE2 secondary, respectively.

Figure 8:
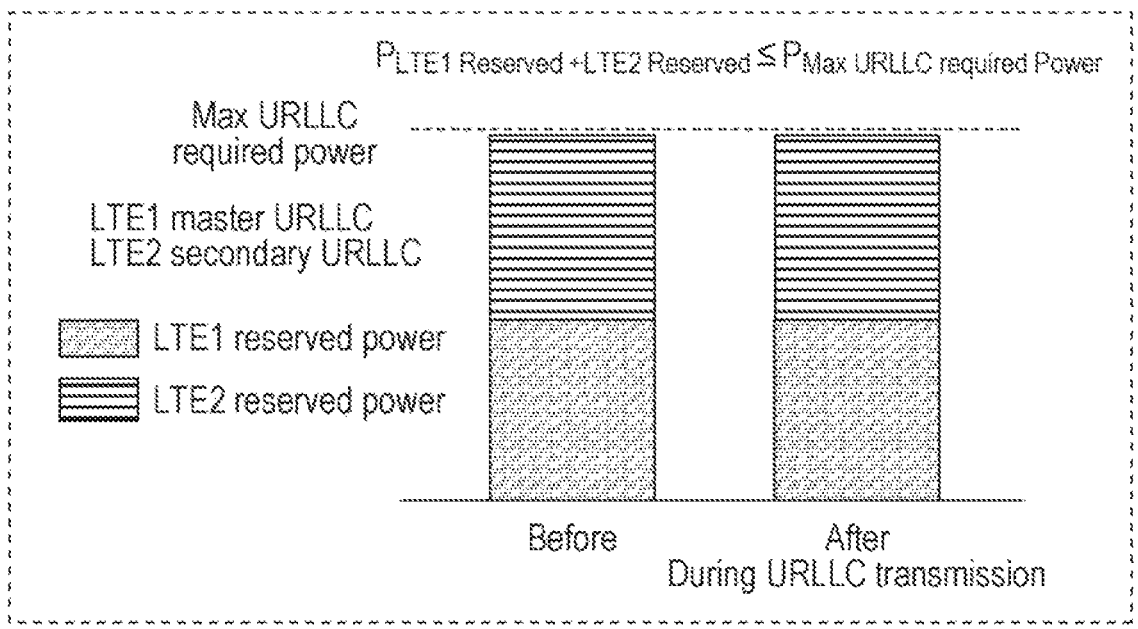
FIG. 8 illustrates an example of power utilization in LTE-LTE dual connectivity during URLLC simultaneous transmission according to Modification 3 of the embodiment.

The user equipment 100 can use the reserved power of each of the LTE1 and LTE2 secondary, as illustrated in FIG. 8, so URLLC transmission is executed efficiently using power with low latency.

Note that in the LTE-LTE dual connectivity in case (vi), the LTE1 may be set as the secondary (LTE1 secondary) and the LTE2 may be set as the master (LTE2 master) (omitted from illustration). In this case as well, in a case of having determined that uplink transmission for URLLC is necessary in the LTE1 secondary and LTE2 master, the user equipment 100 decides power to be used for uplink transmission for URLLC in the LTE1 secondary and LTE2 master, in the same way as described above. That is to say, the user equipment 100 decides to use the reserved power of each of the LTE1 secondary and LTE2 master for URLLC transmission in the LTE1 secondary and LTE2 master, respectively, in the same way as illustrated in FIG. 8. Accordingly, the user equipment 100 can use the reserved power of each of the LTE1 secondary and LTE2 master, so URLLC transmission is executed efficiently using power with low latency.

[Case (vii) (FIG. 9)]

In case (vii), an NR cell is set as the master (referred to as "NR master") and an LTE is set as the secondary (referred to as "LTE secondary") in LTE-NR dual connectivity.

The user equipment 100 having structure similar to FIG. 2A is simultaneously connected to both the NR master and LTE secondary. The maximum power during uplink transmission at the user equipment 100 is limited to the RF capabilities of the user equipment 100. The user equipment 100 is allocated with uplink transmission reserved power for each of NR and LTE here, as in the above embodiment (see Before in FIG. 9).

The user equipment 100 (transmission determining circuit 500a) here determines that uplink transmission for URLLC is necessary in both the NR master and LTE secondary. Note that URLLC signals may include URLLC control information and/or URLLC data information.

In this case, the user equipment 100 (power level determining circuit 500b) decides power to be used for uplink transmission for URLLC in the NR master and LTE secondary (ST204 in FIG. 3). Specifically, the power level determining circuit 500b decides to use the reserved power of each of the NR master and LTE secondary for URLLC transmission in the NR master and LTE secondary, respectively, without using reserved power of another communication network (see After in FIG. 9). The user equipment 100 (transmitter interface circuit 400b) transmits respective URLLC signals in both the NR master and LTE secondary, using the reserved power of the NR master and the LTE secondary, respectively.

Figure 9:
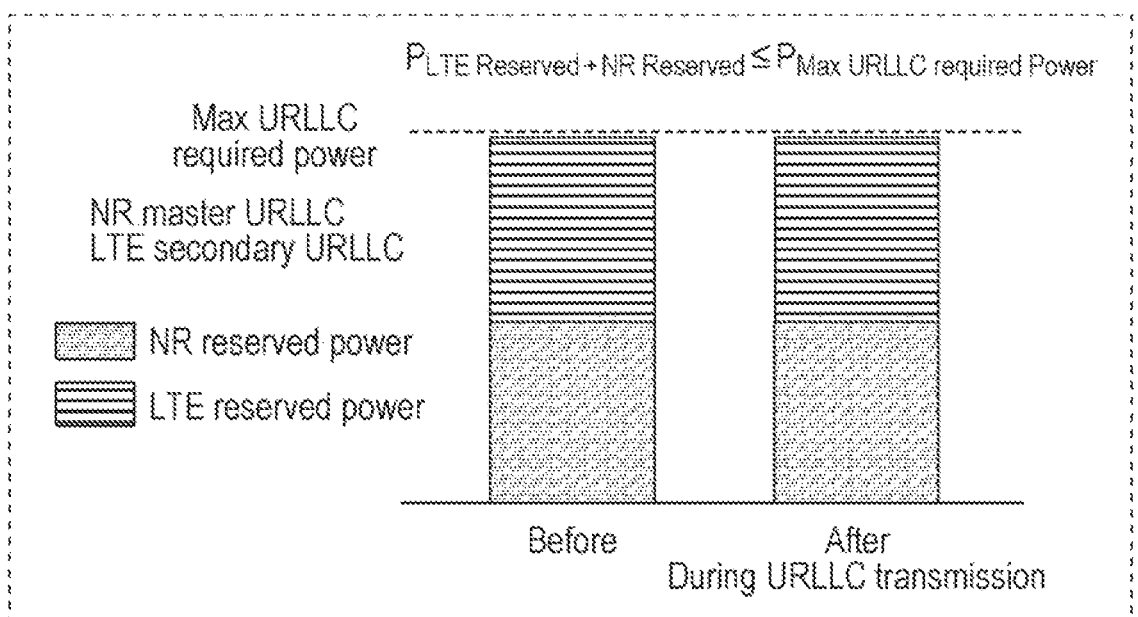
FIG. 9 illustrates an example of power utilization in LTE-NR dual connectivity during URLLC simultaneous transmission according to Modification 3 of the embodiment.

The user equipment 100 can use the reserved power of each of the NR master and LTE secondary, as illustrated in FIG. 9, so URLLC transmission is executed efficiently using power with low latency.

Note that in the LTE-NR dual connectivity in case (vii), the NR may be set as the secondary (NR secondary) and the LTE may be set as the master (LTE master) (omitted from illustration). In this case as well, in a case of having determined that uplink transmission for URLLC is necessary in the NR secondary and LTE master, the user equipment 100 decides power to be used for uplink transmission for URLLC in the LTE master and NR secondary, in the same way as described above. That is to say, the user equipment 100 decides to use the reserved power of each of the LTE master and NR secondary for URLLC transmission in the LTE master and NR secondary, respectively, in the same way as illustrated in FIG. 9. Accordingly, the user equipment 100 can use the reserved power of each of the LTE master and NR secondary, so URLLC transmission is executed efficiently using power with low latency.

The above description is an exemplary embodiment of the present disclosure, and does not restrict the present disclosure.

The present disclosure can be realized by software, hardware, or software in cooperation with hardware. The functional blocks such as used in the above-described embodiment are partly or fully realized as LSI that is an integrated circuit, and the processes described in the above embodiment may be partially or entirely controlled by one LSI or a combination of LSIs. These LSIs may be individually formed into one chip, or part or all of the functional blocks may be included in one chip. LSIs may have data input and output. There are different names of LSIs such as IC, system LSI, super LSI, and ultra LSI, depending on the degree of integration. The circuit integration technique is not restricted to LSIs, and dedicated circuits, general-purpose processors, or dedicated processors may be used to realize the same. An FPGA (Field Programmable Gate Array) which can be programmed after manufacturing the LSI, or a reconfigurable processor where circuit cell connections and settings within the LSI can be reconfigured, may be used. The present disclosure may be realized by digital processing or analog processing. Further, in the event of the advent of an integrated circuit technology which would replace LSIs by advance of semiconductor technology or a separate technology derived therefrom, such a technology may be used for integration of the functional blocks, as a matter of course. Application of biotechnology and so forth is a possibility.

Several examples of an embodiment of the present disclosure have been described in detail with reference to attached drawings of specific embodiment. Of course, it is impossible to list all conceivable combinations of components and technologies, so one skilled in the art will appreciate that various types of modifications can be applied to the above embodiment without departing from the scope of the present disclosure. For example, while description has been made of the above embodiment with reference to part of a 3GPP (Third Generation Partnership Project) network, it will be readily understood that an embodiment of the present disclosure is applicable to networks such as a successor network to a 3GPP network having similar functional components and so forth.

Accordingly, 3GPP terminology and related terminology used in the above description, attached drawings, and attached claims, in particular, should be appropriately interpreted hereinafter.

Particularly, modifications and other embodiments of the present disclosure are conceivable by one skilled in the art who has received the benefits of lessons set forth in the following description and related drawings. Accordingly, the present disclosure is not restricted to specific embodiment that has been disclosed, rather, modifications and other embodiments are assumed to be included in the scope of the present disclosure. Although specific terminology has been used here, this has been used for general and descriptive purposes, and is not intended to apply restrictions.

User equipment according to the present disclosure is user equipment capable of executing dual connectivity in a communication network, and includes a wireless interface circuit that simultaneously communicates with two communication networks, where URLLC (ultra-reliable, low latency communication) is operated in one of the two communication networks, and a control circuit that determines that the URLLC transmission is necessary regarding the one communication network, and that the URLLC is not operated in another communication network of the two communication networks. The control circuit decides to use a first reserved power of the one communication network, and a second reserved power of the other communication network in which the URLLC is not operated, for transmission of the URLLC as to the one communication network where the URLLC transmission is necessary. The wireless interface circuit transmits signals of the URLLC over the one communication network, using the first reserved power and the second reserved power.

In the user equipment according to the present disclosure, signals of the URLLC are control information for ultra-reliable, low latency communication.

In the user equipment according to the present disclosure, signals of the URLLC are scheduling request (SR) or HARQ-ACK.

In the user equipment according to the present disclosure, the two communication networks are an LTE communication network and an NR communication network, an NR communication network and an NR communication network, or an LTE communication network and an LTE communication network.

In the user equipment according to the present disclosure, the two communication networks are an LTE communication network and an NR communication network, respectively, and the URLLC is operated in the NR communication network.

In the user equipment according to the present disclosure, the two communication networks are an LTE communication network and an NR communication network, respectively, and the URLLC is operated in the LTE communication network.

In the user equipment according to the present disclosure, one of the two communication networks is a master communication network (MCG), and another is a secondary communication network (SCG).

In the user equipment according to the present disclosure, the master communication network is an NR communication network, and the secondary communication network is an LTE communication network.

In the user equipment according to the present disclosure, the master communication network is an LTE communication network, and the secondary communication network is an NR communication network.

In the user equipment according to the present disclosure, the two communication networks are an NR communication network and an NR communication network. One of the NR communication networks is a master communication network (MCG), and another NR communication network is a secondary communication network (SCG).

In the user equipment according to the present disclosure, the two communication networks are an LTE communication network and an LTE communication network. One of the LTE communication networks is a master communication network (MCG), and another LTE communication network is a secondary communication network (SCG).

User equipment according to the present disclosure is user equipment capable of executing dual connectivity in a communication network, and includes a wireless interface circuit that simultaneously communicates with two communication networks, where URLLC (ultra-reliable, low latency communication) is operated in both of the two communication networks, and a control circuit that determines that the URLLC transmission is necessary regarding both of the two communication networks. The control circuit decides to use reserved power of each of the two communication networks for the URLLC transmission to the two communication networks, respectively, instead of using reserved power of another communication network. The wireless interface circuit transmits signals of the URLLC over the two communication networks, using the reserved power of each of the two communication networks.

A method according to the present disclosure is an execution method of dual connectivity in a communication network, the method including: communicating with two communication networks, where URLLC (ultra-reliable, low latency communication) is operated in one of the two communication networks; determining that the URLLC transmission is necessary regarding the one communication network, and that the URLLC is not operated in another communication network of the two communication networks; deciding to use a first reserved power of the one communication network, and a second reserved power of the other communication network in which the URLLC is not operated, for transmission of the URLLC as to the one communication network where the URLLC transmission is necessary; and transmitting signals of the URLLC over the one communication network, using the first reserved power and the second reserved power.

A method according to the present disclosure is an execution method of dual connectivity in a communication network, the method including: communicating with two communication networks, where URLLC (ultra-reliable, low latency communication) is operated in both of the two communication networks; determining that the URLLC transmission is necessary regarding both of the two communication networks; deciding to use reserved power of each of the two communication networks for transmission of the URLLC to the two communication networks, respectively, instead of using reserved power of another communication network; and transmitting signals of the URLLC over the two communication networks, using the reserved power of each of the two communication networks.

An embodiment of the present disclosure is useful in a mobile communication system.

REFERENCE SIGNS LIST 100 user equipment
200, 300 base station
400 wireless interface circuit
400a receiver interface circuit
400b transmitter interface circuit
500 control circuit
500a transmission determining circuit
500b power level determining circuit

The invention claimed is:

1. User equipment capable of executing dual connectivity in a communication network, the user equipment comprising:
a wireless interface circuit, which, in operation, simultaneously communicates with two communication networks, where URLLC (ultra-reliable, low latency communication) is operated in one of the two communication networks; and
a control circuit, which, in operation, determines that the URLLC transmission is necessary regarding the one communication network, and that the URLLC is not operated in another communication network of the two communication networks,
wherein the control circuit, in operation, decides to use a first reserved power of the one communication network, and a second reserved power of the other communication network in which the URLLC is not operated, for transmission of the URLLC as to the one communication network where the URLLC transmission is necessary, and
wherein the wireless interface circuit, in operation, transmits signals of the URLLC over the one communication network, using the first reserved power and the second reserved power.

2. The user equipment according to claim 1,
wherein signals of the URLLC are control information for ultra-reliable, low latency communication.

3. The user equipment according to claim 1,
wherein signals of the URLLC are scheduling request (SR) or HARQ-ACK.

4. The user equipment according to claim 1,
wherein the two communication networks are an LTE communication network and an NR communication network, an NR communication network and an NR communication network, or an LTE communication network and an LTE communication network.

5. The user equipment according to claim 1,
wherein the two communication networks are an LTE communication network and an NR communication network, respectively, and the URLLC is operated in the NR communication network.

6. The user equipment according to claim 1,
wherein the two communication networks are an LTE communication network and an NR communication network, respectively, and the URLLC is operated in the LTE communication network.

7. The user equipment according to claim 1,
wherein one of the two communication networks is a master communication network (MCG), and another is a secondary communication network (SCG).

8. The user equipment according to claim 7,
wherein the master communication network is an NR communication network, and the secondary communication network is an LTE communication network.

9. The user equipment according to claim 7,
wherein the master communication network is an LTE communication network, and the secondary communication network is an NR communication network.

10. The user equipment according to claim 1,
wherein the two communication networks are an NR communication network and an NR communication network, and
wherein one of the NR communication networks is a master communication network (MCG), and another NR communication network is a secondary communication network (SCG).

11. The user equipment according to claim 1,
wherein the two communication networks are an LTE communication network and an LTE communication network, and
and wherein one of the LTE communication networks is a master communication network (MCG), and another LTE communication network is a secondary communication network (SCG).

12. User equipment capable of executing dual connectivity in a communication network, the user equipment comprising:
a wireless interface circuit, which, in operation, simultaneously communicates with two communication networks, where URLLC (ultra-reliable, low latency communication) is operated in both of the two communication networks; and
a control circuit, which, in operation, determines that the URLLC transmission is necessary regarding both of the two communication networks,
wherein the control circuit, in operation, decides to use reserved power of each of the two communication networks for the URLLC transmission to the two communication networks, respectively, instead of using reserved power of another communication network, and
wherein the wireless interface circuit, in operation, transmits signals of the URLLC over the two communication networks, using the reserved power of each of the two communication networks.

13. The user equipment according to claim 12,
wherein signals of the URLLC are control information for ultra-reliable, low latency communication.

14. The user equipment according to claim 12,
wherein signals of the URLLC are scheduling request (SR) or HARQ-ACK.

15. The user equipment according to claim 12,
wherein the two communication networks are an LTE communication network and an NR communication network, an NR communication network and an NR communication network, or an LTE communication network and an LTE communication network.

16. The user equipment according to claim 12,
wherein the two communication networks are an LTE communication network and an NR communication network, respectively, and the URLLC is operated in the NR communication network.

17. The user equipment according to claim 12,
wherein the two communication networks are an LTE communication network and an NR communication network, respectively, and the URLLC is operated in the LTE communication network.

18. The user equipment according to claim 12,
wherein one of the two communication networks is a master communication network (MCG), and another is a secondary communication network (SCG).

19. The user equipment according to claim 18,
wherein the master communication network is an NR communication network, and the secondary communication network is an LTE communication network.

20. The user equipment according to claim 18,
wherein the master communication network is an LTE communication network, and the secondary communication network is an NR communication network.

21. The user equipment according to claim 12,
wherein the two communication networks are an NR communication network and an NR communication network, and
wherein one of the NR communication networks is a master communication network (MCG), and another NR communication network is a secondary communication network (SCG).

22. The user equipment according to claim 12,
wherein the two communication networks are an LTE communication network and an LTE communication network, and
wherein one of the LTE communication networks is a master communication network (MCG), and another LTE communication network is a secondary communication network (SCG).

23. An execution method of dual connectivity in a communication network, the method comprising:
communicating with two communication networks, where URLLC (ultra-reliable, low latency communication) is operated in one of the two communication networks;
determining that the URLLC transmission is necessary regarding the one communication network, and that the URLLC is not operated in another communication network of the two communication networks;
deciding to use a first reserved power of the one communication network, and a second reserved power of the other communication network in which the URLLC is not operated, for transmission of the URLLC as to the one communication network where the URLLC transmission is necessary; and
transmitting signals of the URLLC over the one communication network, using the first reserved power and the second reserved power.

24. An execution method of dual connectivity in a communication network, the method comprising:
communicating with two communication networks, where URLLC (ultra-reliable, low latency communication) is operated in both of the two communication networks;
determining that the URLLC transmission is necessary regarding both of the two communication networks;
deciding to use reserved power of each of the two communication networks for transmission of the URLLC to the two communication networks, respectively, instead of using reserved power of another communication network; and
transmitting signals of the URLLC over the two communication networks, using the reserved power of each of the two communication networks.

* * * * *